United States Patent [19]
Ueda

[11] Patent Number: 4,951,074
[45] Date of Patent: Aug. 21, 1990

[54] CAMERA HAVING ZOOM STROBE DEVICE
[75] Inventor: Toshiaki Ueda, Tokyo, Japan
[73] Assignee: Asahi Kogaku Kogyo K.K., Tokyo, Japan
[21] Appl. No.: 315,944
[22] Filed: Feb. 27, 1989
[30] Foreign Application Priority Data
Feb. 26, 1988 [JP]  Japan .................... 63-43394
[51] Int. Cl.$^5$ .................. G03B 3/10; G03B 15/05; G03B 13/12
[52] U.S. Cl. ..................... 354/149.1; 354/149.11; 354/199; 354/222
[58] Field of Search .............. 354/149.1, 195.1, 219, 354/199, 126, 149.11, 222

[56] References Cited
U.S. PATENT DOCUMENTS

| | | | |
|---|---|---|---|
| 4,122,466 | 10/1978 | Iwata | 354/32 |
| 4,171,887 | 10/1979 | Hayata | 354/126 |
| 4,319,818 | 3/1982 | Sawara | 354/145 |
| 4,350,420 | 9/1982 | Engelsmann et al. | 354/145 |
| 4,557,571 | 12/1985 | Reibl | 354/149.11 |
| 4,601,563 | 7/1986 | Miyawaki et al. | 354/195.1 |
| 4,609,269 | 9/1986 | Kamata | 354/149.11 |

FOREIGN PATENT DOCUMENTS
5450324 4/1979 Japan .
58-208735 12/1983 Japan .

Primary Examiner—Michael L. Gellner
Attorney, Agent, or Firm—Sandler, Greenblum & Bernstein

[57] ABSTRACT

A camera comprising a zoom lens having a variable power lens group for varying the focal length, a zoom strobe device having an illumination angle varying member, a zoom motor for driving the variable power lens group, and an illumination angle varying mechanism which drives the illumination angle varying member in association with the zooming operation of the zoom lens to vary the illumination angle. The zoom strobe device has a movable strobe housing, in which a light emitting portion is housed. The strobe housing is movable between an inoperative position in which the strobe housing is retracted in a camera body and an operative position in which the strobe housing is projected outward from the camera body. The zooming operation is transmitted to the illumination angle varying member only when the strobe housing is in the operative position.

20 Claims, 7 Drawing Sheets

CAMERA HAVING ZOOM STROBE DEVICE

BACKGROUND OF THE INVENTION

1. Field of the Invention

The present invention relates to a camera with a zoom strobe device in which the illumination angle varies with the zooming operation of a zoom lens.

2. Description of Related Art

The present invention proposes a lens shutter type camera having a zoom lens, a zoom strobe device in which the illumination angle varies in association with the zooming operation of the zoom lens, and a variable power finder device in which the power (magnification) varies, as disclosed in a co-pending U.S. patent application No. 144030.

Figure 12:
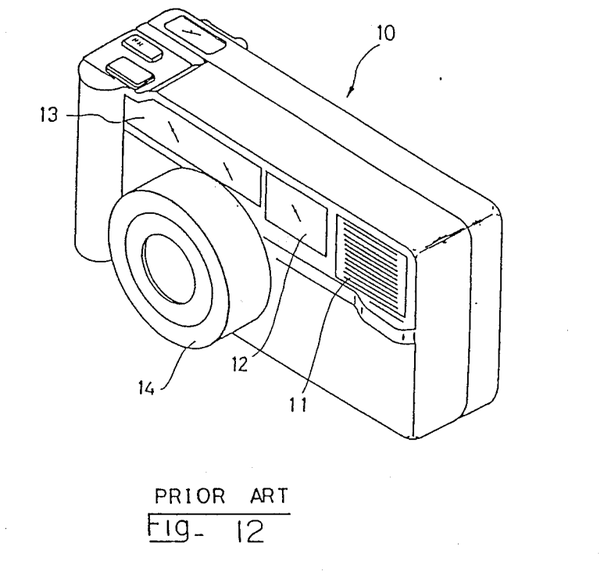

As shown in FIG. 12, the lens shutter type camera disclosed in the above mentioned U.S. application has a right most zoom strobe device 11, an intermediate variable power finder device 12 and a left most light emitting and receiving unit 13 of an object distance measuring device, on an upper portion of a camera body 13, as viewed from front. A zoom lens 14 is provided below the light emitting and receiving unit 13. The variable power finder device 12 and the zoom strobe device 14 in the above-mentioned camera type are relatively large in size in comparison with a conventional camera in which neither the illumination angle nor the angle of view changes. The simplest solution in using a compact camera is to provide the zoom strobe device 11 directly above the zoom lens 14.

However, the provision of the zoom strobe device 11 directly above the zoom lens 14 causes the optical axis of the zoom lens 14 to come very close in position to the optical axis of the zoom strobe device 11, so that a partial vignetting of the illumination light emitted from the zoom strobe device 11 by a lens barrel of the zoom lens 14 takes place, resulting in a failure to wholly illuminate the object. Furthermore, since the light emitting surface of the strobe device 11 is located close in position to the optical axis of the zoom lens 14, a so-called red-eye phenomenon tends to occur.

SUMMARY OF THE INVENTION

The primary object of the present invention is to provide a camera with a zoom strobe device which is located directly above the zoom lens and in which no illuminating light of the zoom strobe device is vignetted by the zoom lens and the zoom lens barrel.

According to the present invention, a camera is provided with a camera body comprising a zoom lens having a variable power lens group for varying the focal length, a zoom strobe device having an illumination angle varying member, a zoom motor for driving the variable power lens group, and an illumination angle varying mechanism which drives the illumination angle varying member in association with the zooming operation of the zoom lens to vary the illumination angle. The improvement of the present invention comprises a movable strobe housing of the zoom strobe device, in which a light emitting portion is housed, a supporting means for supporting the strobe housing as it is oved between an inoperative position in which the strobe housing is retracted in a camera body and an operative position in which the strobe housing is projected outward from the camera body, said illumination angle varying member being housed in the strobe housing, and a clutch means for transmitting the zooming operation to the illumination angle varying member only when the strobe housing is in the operative position.

The strobe housing is preferably located between the light emitter and the light receiver, of the object distance measuring device of a camera.

When the strobe is used in this arrangement, i.e. when the strobe housing is in the operative position, the strobe housing projects upward from the upper surface of the camera body, and accordingly the light emitting surface of the light emitting portion of the strobe device in the strobe housing moves far away from the optical axis of the zoom lens, so that vignetting of the illumination light emitted from the zoom strobe device by the zoom lens is prevented. Furthermore, when no strobe is used, the strobe housing is accommodated in the camera body, resulting in the realization of a compact camera.

In addition to the foregoing, the location of the light emitter and the light receiver, of the object distance measuring device on opposite sides of the strobe housing as viewed from the front, makes it possible to effectively utilize space for the arrangement of the light emitter, the light receiver, the strobe device and the finder device. This also contributes to an increase in precision of the object distance measurement.

BRIEF DESCRIPTION OF THE DRAWINGS

The invention will be described below in detail with reference to the accompanying drawings, in which.

DETAILED DESCRIPTION OF PREFERRED EMBODIMENTS

Figure 1:
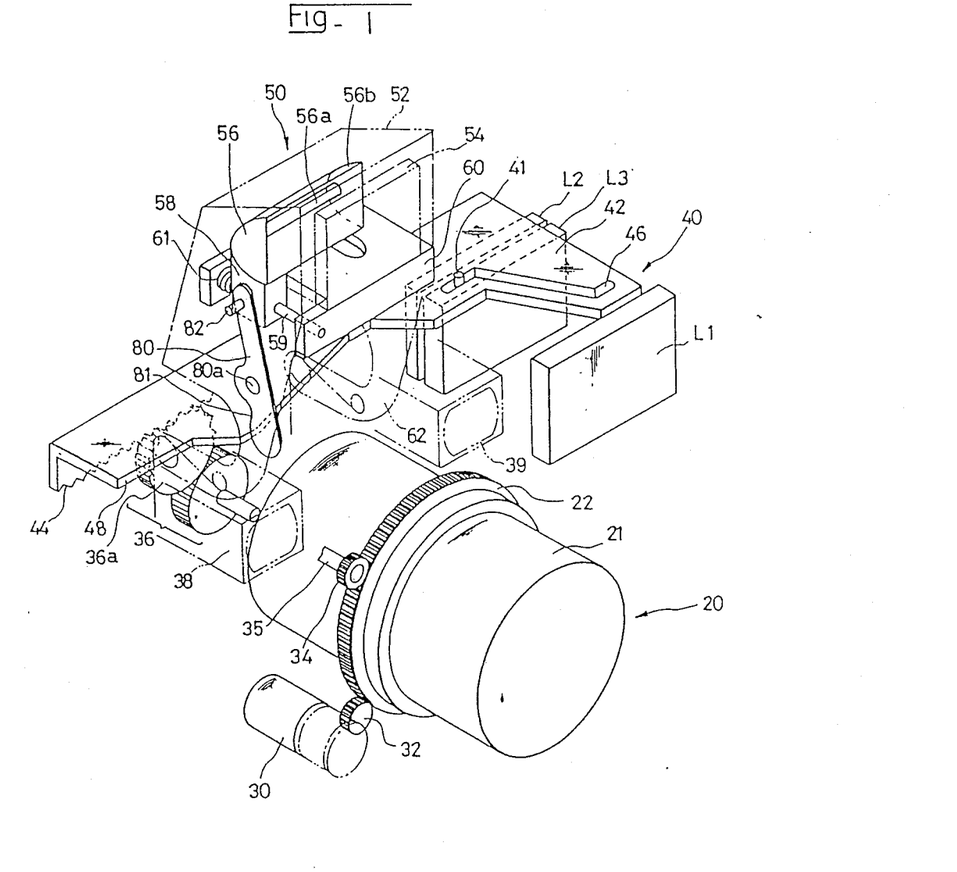
FIG. 1 is a perspective view of the main part of a camera according to an embodiment of the present invention.
Figure 2:
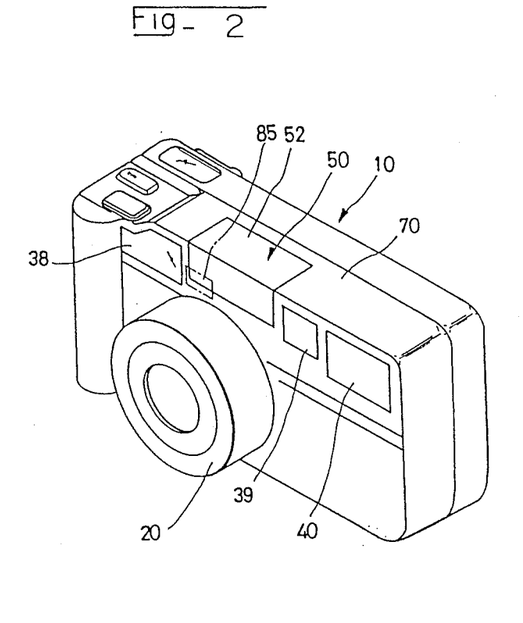
FIG. 2 is a perspective view of a camera having a zoom lens, according to an embodiment of the present invention.

FIG. 1 shows a lens shutter type camera having a zoom lens according to a first embodiment of the present invention, with the camera having a lens barrel block 20 of the zoom lens, a zoom motor 30 for driving the lens barrel, light emitter 38 and light receiver 39 of an object distance measuring device, a power variable finder device 40, and a zoom strobe device 50. These elements are mounted on an immovable portion of a camera body 70.

The lens barrel block 20 has groups of zooming and focusing lenses (not shown) which are relatively moved to effect zooming and focusing operations. These groups of lenses are associated with each other through a cam ring 21 and a cam mechanism that is known per se.

The cam ring 21 is supported by the camera body so as to rotate about the optical axis, but not in the optical axis direction. The cam ring 21 is provided on its outer periphery with a sector gear 22 secured thereto which is in mesh with a pinion 32 connected to the output shaft of the zoom motor 30 through a reduction gear train, so that the cam ring 21 can be rotated by the zoom motor 30 through the pinion 32 and the sector gear 22 to drive the lens groups.

The object distance measuring device detects an object distance based on a known triangulation measuring method. Accordingly, since the precision of measurement increases as the distance (base length) between the light emitter 38 and the light receiver 39 increases, the light emitter 38 and the light receiver 39 are preferably located on the opposite sides of the zoom strobe device 50.

The power variable finder device 40 and the zoom strobe device 50 vary the finder magnification (angle of field) and the illumination angle, in accordance with the change of the focal length (angle of view). The drive source for the finder device 40 and the zoom strobe device 50 is the zoom motor 30.

The sector gear 22 of the cam ring 21 is engaged by another pinion 35 having a shaft 34 which extends rearward and which has at its rear end a reduction gear train 36. The terminal gear 36a of the reduction gear train 36 is engaged by a rack 44 of a cam plate 42.

The cam plate 42 is laterally slidably supported by the camera body 70 and has a downwardly bent rear (lower) end on which the rack 44 is formed, so that the rotation of the sector gear 22 is reduced by the reduction gear train 36 and transmitted to the cam plate 42.

Figure 6:
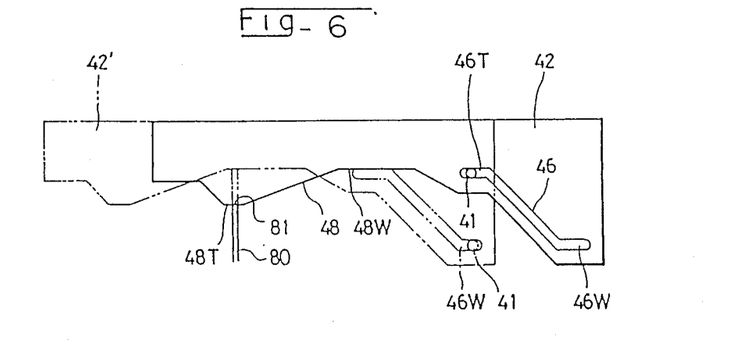
FIG. 6 is a plan view of a cam plate shown in FIG. 1.

The cam plate 42 is provided on its upper surface with a variable power cam groove 46 for the finder device 40. An illumination angle varying cam surface 48 for the zoom strobe device 50 is formed on the front end face of the cam plate 42 located in front of the rack 44. The plan view profile of the cam plate 42 is shown in FIG. 6.

The optical system of the finder device 40 includes a stationary objective lens $L_1$, an eye-piece $L_2$, and a movable variable power lens $L_3$ between the objective lens $L_1$ and the eye-piece $L_2$. The variable power lens $L_3$ is supported so as to move in the optical axis direction of the finder device and has an upper driven pin 41 which is fitted in the variable power cam groove 46, so that when the cam plate 42 reciprocally moves in the lateral directions, the driven pin 41, and accordingly the variable power lens $L_3$, are moved forward and backward to change the magnification (field of view).

The zoom strobe device 50 comprise a movable strobe housing 52, a condenser lens 54 secured to the front face of the strobe housing 52, and a light emitting portion (illumination angle varying member) 56 which includes a xenon lamp (light emitting tube) 56a and a reflecting shade 56b, provided in the rear portion of the strobe housing 52.

The light emitting portion 56 is supported by the strobe housing to move away from and closer to the condenser lens 54. The supporting and guiding mechanism of the light emitting portion 56 has a support 58 to which the light emitting portion 56 is secured, a guide rod 59 which slidably supports the support 58, and a base 60 which supports the guide rod 59. The base 60 is secured to the bottom of the strobe housing 52. The guide rod 59 has a compression spring 61 which surrounds the the guide rod 59 to continuously bias the light emitting portion 56 toward the condenser lens 54.

Generally L-shaped legs 62, 62 are provided on the strobe housing 52 to integrally extend downward and rearward from the lower opposite sides of the strobe housing 52. The front ends of the legs 62 are rotatably connected to the camera body 70 through respective shafts 63, 63. Namely, the strobe housing 52 is rotatable between an accomodated position (inoperative position) in which the strobe housing 52 is retracted in the camera body and a projected position (operative position) in which the strobe housing 52 is projected outward from the camera body through the legs 62.

The camera body 70 has an accommodating chamber 72 which accommodates the strobe housing 52 when it is retracted in the camera body. The rear surface of the strobe housing 52 defines a part of an outer surface of the camera together with the camera body 70. The shafts 63 have torsion springs 64 which are wound therearound to continuously bias the strobe housing 52 toward the projected position (erect position).

The following discussion will be directed to the illumination angle varying device which drives the light emitting portion 56.

One of the legs 62 (e.g. the left leg in FIG. 1) is provided on its inner surface with a zoom lever 80 which is rotatably supported thereby. The front (upper) end of the zoom lever 80 bears against a pin 82 provided on the support 58 to receive the spring force of the compression spring 61. The lower end of the zoom lever 80 is pressed against the illumination angle varying cam surface 48 when the strobe housing 52 is in the operative position. Accordingly, when the cam plate 42 reciprocally moves in either the right or left hand directions, the zoom lever 80 rotates (swings) about its shaft 80a, in accordance with the profile of the illumination angle varying cam surface 48, so that the light emitting portion 56 is moved forward or backward against the compression spring 61 to move away from said close to the condenser lens 54 (FIGS. 3 and 4) to thereby change the illumination angle. The zoom lever 80 is provided on its lower end with a cam surface 81 which comes into slide contact with the illumination angle varying cam surface 48. The cam surface 81 has a profile so that the displacement of the illumination angle varying cam surface 48 in the optical axis direction has a linear relation to the displacement of the pin in the optical axis direction, resulting in an easy design of the illumination angle varying the profile of cam surface 48.

Figure 4:
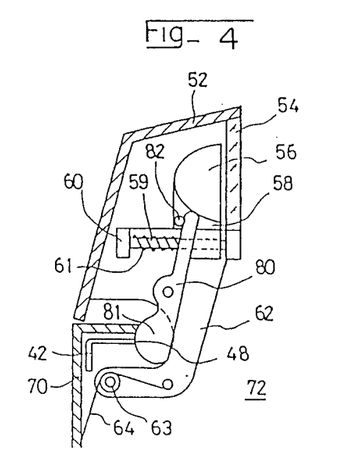

The cam surface 81 and the illumination angle varying cam surface 48 do not come into contact with each other when the strobe device 52 is retracted in the accomodated position or in the inoperative position (FIG. 4). Namely, the zoom lever 80 serves as a cluch which prevents transmission of movement of the cam plate 42 to the light emitting portion 56 to decrease the electrical power consumption of the zoom motor 30.

Figure 5:
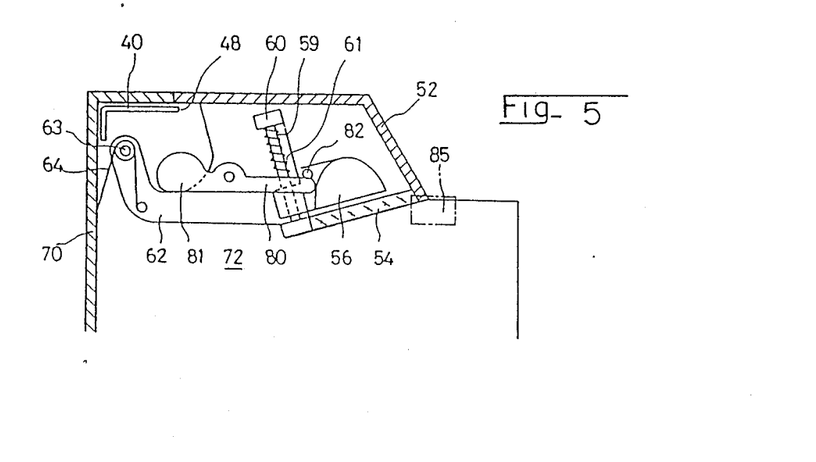

The strobe housing 52 which occupies the accommodated position, as shown in FIG. 5, is locked therein by a locking mechanism (not shown) having an unlocking lever against the rotational force of the torsion springs 64. The lock is released by operating the unlocking lever to rotate the strobe housing 52 toward the projected position with the help of the rotational force of the torsion springs 64. As a result, the strobe housing 52 projects outward and upward from the camera body, so that the condenser lens 54 is opposite an object to be photographed.

The apparatus according to the above-mentioned first embodiment operates as follows:

When the zoom strobe device 50 is not in use (inoperative), the strobe housing 52 is locked in the accommodated position shown in FIG. 5. When the zooming operation is effected, the zoom motor 30 rotates to move the lens barrel through the sector gear 22 and the cam ring 21, as well as to reciprocally move the cam plate 42 in the right or left hand directions through the sector gear 22, the pinion 34, the reduction gear train 36 and the rack 44. The lateral movement of the cam plate 42 causes the forward and rearward movement of the variable power lens $L_3$ through the driven pin 41, so that the magnification (field of view) of the variable power finder device 50 is changed in accordance with the change of the focal length of the lens barrel block 20. However, since the cam surface 81 of the zoom lever 80 is disengaged from the illumination angle varying cam surface 48 in the accommodated position, the light emitting portion 56 of the zoom strobe device 50 does not move.

When the zoom strobe device 50 is used, the unlocking means 85 is released to project the strobe housing 52. When the lock is released, the strobe housing 52 is rotated by the rotational force of the torsion springs 64, so that the strobe housing 52 is brought into the projected position (operative position). The strobe housing 52 is maintained in the projected position by a proper stop means which may be established the terminal end of the movable strobe housing 52 that comes into abutment with the camera body 70. In the course of rotation of the strobe housing toward the projected position, the cam surface 81 comes into contact with the illumination angle varying cam surface 48, so that when the strobe housing 52 is in the projected positon, the cam surface 81 is continuously engaged by the illumination angle varying cam surface 48.

When the zooming is effected in the projected position, the zoom motor 30 rotates to move the lens barrel block 20 and reciprocally move the cam plate 42 in the right or left hand directions through the sector gear 22, the pinion 34, the reduction gear train 38, and the rack 44. The movement of the cam plate 42 causes the magnification (field of view) of the finder device 40 to be varied in accordance with the change of the focal length of the lens barrel block 20. At the same time, the zoom lever 80 having the cam surface 81 which comes into slide contact with the illumination angle varying cam surface 48, is rotated to move the light emitting portion 56 forward or backward, to thereby vary the illumination angle of the zoom strobe device 50, in accordance with the change of the focal length (angle of view) of the lens barrel block 20.

Figure 3:
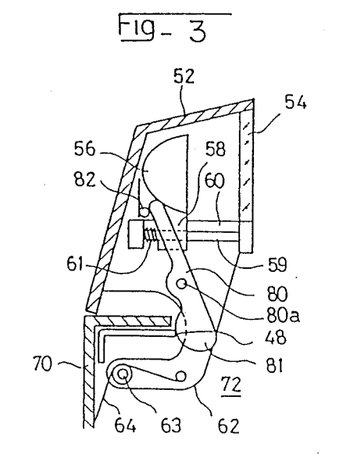
FIGS. 3, 4 and 5 are longitudinal sectional views of a main part of an embodiment of the present invention, shiown in different operational positions.

FIG. 3 shows the smallest illumination angle position in which the light emitting portion 56 is furthest from the condenser lens 54. FIG. 4 shows the largest illumination angle position in which the light emitting portion 56 is closest to the condenser lens 54. In the smallest illumination angle position shown in FIG. 3, the cam plate 42 occupies a position designated with a solid line in FIG. 6, in which the driven pin 41 is positioned in the telephoto-extremity 46T of the cam groove 46, and the cam surface 81 comes into contact with the telephoto-extremity 48T of the illumination angle varying cam surface 48. In the largest illumination angle position shown in FIG. 4, the cam plate 42 occupies a position designated with a dashed-dotted line 42' in FIG. 6, in which the driven pin 41 is positioned in the wide-angle extremity 46W of the cam groove 46, and the cam surface 81 comes into contact with the wide-angle extremity 48W of the illumination angle varying cam surface 48.

When the zoom strobe device 50 is retracted in the accommodated position, the strobe housing 52 is rotated into the accommodated position agaist the torsion springs 64 until it is locked by the locking device. FIG. 5 shows a locked position of the strobe housing 52. When the strobe housing 52 is rotated into the accommodated position, the cam surface 81 comes away from the illumination angle varying cam surface 48, and accordingly the light emitting portion 56 is moved foward by the spring force of the compression spring 61 to move to the lrgest illumination angle position.

FIGS. 7 through 10 show a second embodiment of the present invention. In the second embodiment shown in FIGS. 7-10, the elements corresponding to those in the first embodiment are designated with the same reference numerals.

Figure 7:
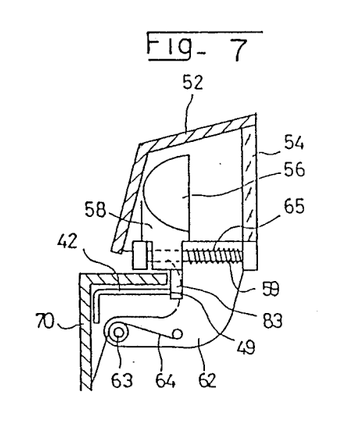
FIGS. 7, 8 and 9 are longitudinal sectional views of the main part of a camera according to a second embodiment of the present invention.
Figure 8:
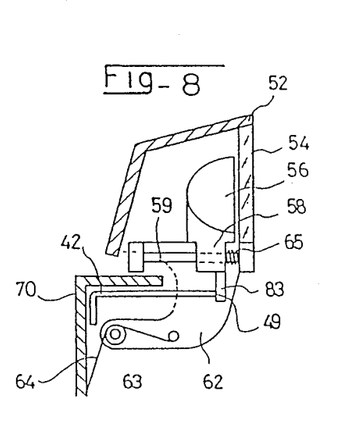
Figure 9:
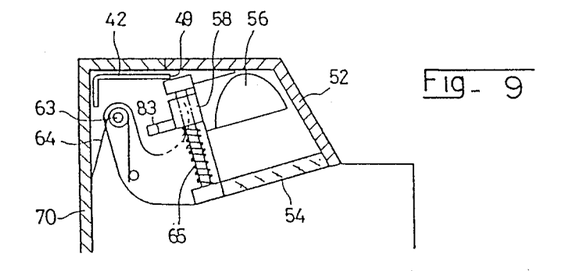

In the second embodiment, the driven pin 83 provided on the support 58 directly abuts against the illumination angle varying cam surface 49 of the cam plate 42. The compression spring 65 is provided around the guide rod 59 to continuously bias the support 58 (the light emitting portion 56), so that the support 59 tends to come away from the condenser lens 54.

The illumination angle varying cam surface 49 and the driven pin 83 come into slidable contact with each other when the strobe housing 52 is in the projected position, as shown in FIGS. 7 and 8. On the contrary, when the strobe housing 52 is in the accommodated position, the illumination angle varing cam surface 49 is disengaged from the driven pin 83, as shown in FIG. 9, so that the lateral movement of the cam plate 42 is not transmitted to the driven pin 83. Namely, similarly to the first embodiment, the illumination angle varying cam surface 49 and the driven pin 83 serve as a clutch.

When the zoom motor 30 is driven at the projected position of the strobe housing 52, the cam plate 42 reciprocally moves in the right or left hand directions, so that the light emitting portion 56 is moved forward or backward through the driven pin 83 which is moved forward or backward while keeping a slidable contact with the illumination angle varying cam surface 49 to vary the illumination angle. FIG. 7 shows the smallest illumination angle position and FIG. 8 shows the largest illumination angle position.

Figure 10:
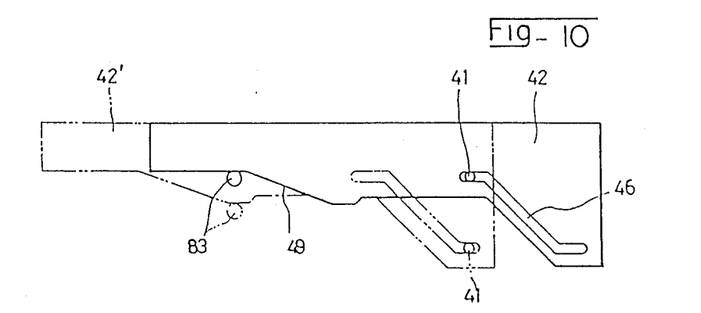
FIG. 10 is a plan view of a cam plate according to a second embodiment of the present invention.

FIG. 10 is a plan view of the cam plate 42 in the second embodiment.

The cam plate 42 is slightly different in shape from that shown in FIG. 6. Namely, only the profile of the illumination angle varying cam surface 49 is different from that of the cam plate shown in FIG. 6. This is because in the second embodiment, the profile of the illumination angle varying cam surface 49 directly defines the track of the movement of the light emitting portion 56. In FIG. 10, the cam plate occupies the smallest illumination angle position and the cam plate 42' shown by a dashed-dotted line occupies the largest illumination angle position.

Figure 11:
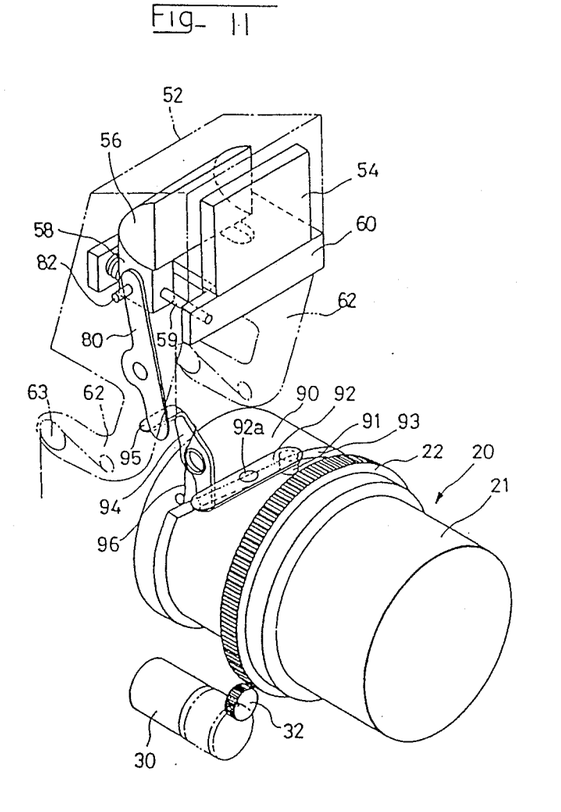
FIG. 11 is a perspective view of the main part of a camera according to a third embodiment of the present invention; and, FIG. 12 is a perspective view of a conventional camera.

A third embodiment of the present invention is shown in FIG. 11. The basic construction of the zoom lens barrel 20 and the zoom strobe device 50 is substantially same as that of the first embodiment. The elements corresponding to those in the first embodiment are designated with the same reference numerals as those of the first embodiment.

In the third embodiment, as seen in FIG. 11, the cam plate 42 in the first embodiment is replaced with a cam portion 90 formed on the cam ring 21. The cam portion 90 is provided on the outer periphery of the cam ring 21 and has a cam surface 91 against which a driven pin 93 bears. The driven pin 93 is provided on one end of a driven lever 92 which is rotatably supported on the camera body through a shaft 92a. The opposite end of the driven lever 92 bears against one end of an intermediate lever 94 which is supported on the camera body so as to rotate in a plane perpendicular to the plane of the driven lever 92, so that the zoom lever 80 can be moved by the cam ring 21 in accordance with the profile of the cam surface 91 through the driven lever 92 and the intermediate lever 94. The intermediate lever 94 is biased by a torsion spring 96, so that the pin 93 of the driven lever 92 continuously comes into abutment with the cam surface 91. An opposite bent end 95 of the intermediate lever 94 abuts against the lower end of the zoom lever 80.

When the cam ring 21 is rotated by a zooming operation, the driven lever 92 rotates in accordance with the profile of the cam surface 91, so that the light emitting portion 56 is moved forward or backward through the intermediate lever 92 and the zoom lever 80 to change the illumination angle.

The bent end 95 of the intermediate lever 94 and the zoom lever 80 function as a clutch similarly to the above-mentioned embodiments, so that they come into engagement with each other when the strobe housing 52 is in the projected position and are disengaged from each other when the strobe housing is in the accommodated position.

Alternatively, in the third embodiment illustrated in FIG. 11, it is possible to provide the driven pin on the support 58, so that the driven pin can be directly engaged by and disengaged from the bent end 95 of the intermediate layer 94, similarly to the second embodiment shown in FIGS. 7 through 9. With this design, the zoom lever 80 can be dispensed with.

According to the present invention, since the zoom strobe device varies the illumination angle in association with the zooming operation of the zoom lens is provided above the zoom lens and since the strobe housing is movable between the accommodated position (inoperative position) and the projected position (operative position), the vignetting of the illuminating light by the zoom lens barrel can be effectively prevented. This also contributes to a realization of a compact camera.

When the strobe housing is in the accommodated position, the functional connection between the zooming operation and the strobe housing is broken, and accordingly the power consumption of the zoom motor can be decreased.

Furthermore, according to the present invention, since the optical axis of the zoom strobe device is far from the optical axis of the zoom lens, no red-eye phenomenon occurs.

In addition to the foregoing, when the light emitter and the light receiver of the object distance measuring device are located on the opposite sides of the movable strobe housing, the base length can be increased and the space between the light emitter and the light receiver can be effectively utilized, thus resulting in the realization of a compact camera.

I claim:

1. A camera with a camera body comprising a zoom lens having a variable power lens group for varying the focal length, a zoom strobe device having an illumination angle varying member, a zoom motor for driving the variable power lens group, and an illumination angle varying mechanism which drives the illumination angle varying member in association with the zooming operation of the zoom lens to vary the illumination angle, wherein the improvement comprises a movable strobe housing of the zoom strobe device, in which a light emitting portion is housed, supporting means for supporting the strobe housing to move between an inoperative position in which the strobe housing is retracted in the camera body and an operative position in which the strobe housing is projected outward from the camera body, said illumination angle varying member being housed in the strobe housing, and clutch means for transmitting the zooming operation to the illumination angle varying member only when the strobe housing is in the operative position.

2. A camera according to claim 1, wherein said illumination angle varying member comprises a light emitting portion having a light emitting tube and a reflecting shade, and wherein said camera comprises a stationary condenser lens for condensing the ight of the light emitting tube, said light emitting portion being capable of moving away from and closer to the stationary condenser lens.

3. A camera according to claim 2, further comprising a guide rod which movably supports the light emitting portion to move away from and closer to the stationary condenser lens.

4. A camera according to claim 1, wherein said supporting means comprises at least one leg member which is rotatably connected at one of its ends to the camera body and is integrally connected to the strobe housing to rotate the strobe housing between the inoperative position and the operative position.

5. A camera according to claim 1, wherein said supporting means comprises a biasing spring which continuously biases the strobe housing toward the operative position, and a locking member which locks the strobe housing at the operative position against the biasing spring.

6. A camera according to claim 1, wherein said strobe housing is located above the zoom lens.

7. A camera according to claim 1, wherein said strobe housing has an outer surface which defines a part of the outer surface of the camera body when the strobe housing is in the inoperative position.

8. A camera according to claim 1, further comprising an object distance measuring device having a light emitter and a light receiver, said light emitter and said light receiver being located on opposite sides of the strobe housing.

9. A camera according to claim 1, wherein said illumination angle varying mechanism comprises a cam plate which is supported by the camera body for lateral movement and which is laterally moved by the zoom motor, said cam plate having an illumination angle varying cam surface, a zoom lever which is rotatably supported by the strobe housing and which comes into slide contact at its one end with the illumination angle varying cam surface only when the strobe housing is in the operative position, and a pin which is provided on the light emitting portion and which bears against the opposite end of the zoom lever.

10. A camera according to claim 9, wherein said zoom lever is provided on said one end with a cam surface which comes into slidable contact with the illumination angle varying cam surface of the cam plate.

11. A camera according to claim 9, wherein said illumination angle varying mechanism comprises a cam plate which is supported by the camera body for lateral movement and which is laterally moved by the zoom motor, said cam plate having an illumination angle varying cam surface, and a driven pin is provided on the light emitting portion which comes into slidable contact with the illumination angle varying cam surface only when the strobe housing is in the operative position.

12. A camera body according to claim 9, wherein said illumination angle varying mechanism comprises a cam ring which is provided on a lens barrel of the zoom lens, said cam ring having a cam surface, a rotatable intermediate lever which comes into slidable contact at one end with the opposite end of said rotatable intermediate lever to rotate only when the strobe housing is in the operative position, and a pin which is provided on the light emitting portion and which abuts against the opposite end of the zoom lever.

13. A camera according to claim 9, wherein said illumination angle varying mechanism comprises a cam ring which is provided on a lens barrel of the zoom lens, said cam ring having a cam surface, a rotatable intermediate lever which comes into slidable contact at one end with the cam surface to rotate, a pin which is provided on the light emitting portion and which comes into contact with the opposite end of the intermediate lever only when the strobe housing is in the operative position, and a pin which is provided on the light emitting portion and which bears against the opposite end of the zoom lever.

14. A camera having a camera body, said camera comprising:
   a moveable lens group;
   a strobe device having an illumination angle varying member;
   an illumination angle varying mechanism which drives said illumination angle varying member for varying the illumination angle of said strobe device;
   a moveable strobe housing for said strobe device in which a light emitting portion is housed, said illumination angle varying member being housed in said strobe housing;
   means for supporting said strobe housing for moving between (i) an inoperative position, in which said strobe housing is retracted toward the camera body, and (ii) an operative position, in which said strobe housing is projected outwardly from the camera body; and
   clutch means for transmitting movement of said moveable lens group to said illumination angle varying member only when said strobe housing is in the operative position.

15. A camera according to claim 14, wherein said illumination angle varying member is housed in said strobe housing.

16. A camera having a camera body, said camera comprising:
   a zoom lens;
   a zoom strobe device having an illumination angle varying member;
   a zoom motor for driving said zoom lens;
   an illumination angle varying mechanism for driving said illumination angle varying member for varying the illumination angle of said zoom strobe device;
   a moveable strobe housing for said zoom strobe device in which a light emitting portion is housed;
   means for supporting said strobe housing for moving between (i) an inoperative position, in which the strobe housing is retracted toward the camera body, and (ii) an operative position, in which said strobe housing is projected outwardly from the camera body; and
   means for moving said illumination angle varying member in synchronism with movement of said zoom lens after said strobe housing is moved to the operative position.

17. A camera according to claim 16, wherein said illumination angle varying member is housed in said strobe housing.

18. A camera according to claim 16, wherein said means for moving said illumination angle varying member in synchronism with movement of said zoom lens transmits movement only when said strobe housing has been moved toward said operative position.

19. A camera having a camera body, said camera comprising:
   a zoom lens;
   a zoom strobe device having an illumination angle varying member;
   a zoom motor for driving said zoom lens;
   an illumination angle varying mechanism for driving said illumination angle varying member for varying the illumination angle of said zoom strobe device;
   a moveable strobe housing for said zoom strobe device in which a light emitting portion is housed;
   means for supporting said strobe housing for moving between (i) an inoperative position, in which the strobe housing is retracted toward the camera body, and (ii) an operative position, in which said strobe housing is projected outwardly from the camera body; and
   means for moving said illumination angle varying member in synchronism with movement of said zoom motor after said strobe housing has been moved toward the operative position.

20. A camera according to claim 19, wherein said means for moving said illumination angle varying member in synchronism with movement of said zoom lens transmits movement only when said strobe housing has been moved toward the operative position.

* * * * *

UNITED STATES PATENT AND TRADEMARK OFFICE
CERTIFICATE OF CORRECTION

PATENT NO. : 4,951,074
DATED : August 21, 1990
INVENTOR(S) : Toshiaki UEDA

It is certified that error appears in the above-indentified patent and that said Letters Patent is hereby corrected as shown below:

At column 1, line 62, change "it is oved between" to ---it is moved between---.
At column 3, line 53, change "50 comprise a" to ---50 comprises a---.
At column 4, line 1, after "rounds" delete [the] (first occurrence).
At column 5, line 29, after "established" insert ---by---.
At column 6, line 15, change "the lrgest" to ---the largest---.
At column 6, line 58, after "plate" insert ---42,---.
At column 8, line 23, (claim 2, line 5) change "condensing the ight" to ---condensing the light---.

Signed and Sealed this

Twenty-eight Day of February, 1995

Attest:

BRUCE LEHMAN

Attesting Officer

Commissioner of Patents and Trademarks